A. D. STANDEFORD.
UNIVERSAL TRANSMISSION GEARING.
APPLICATION FILED AUG. 23, 1916.
1,356,231.
Patented Oct. 19, 1920.
2 SHEETS—SHEET 1.
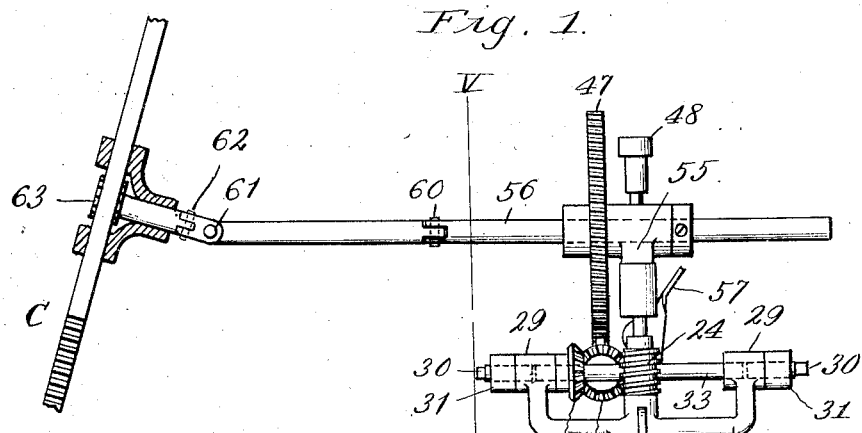
Fig. 1.
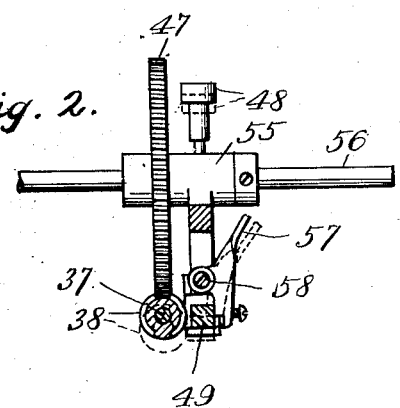
Fig. 2.
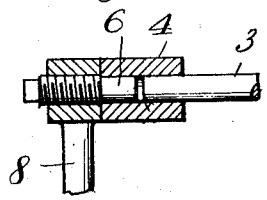
Fig. 3.
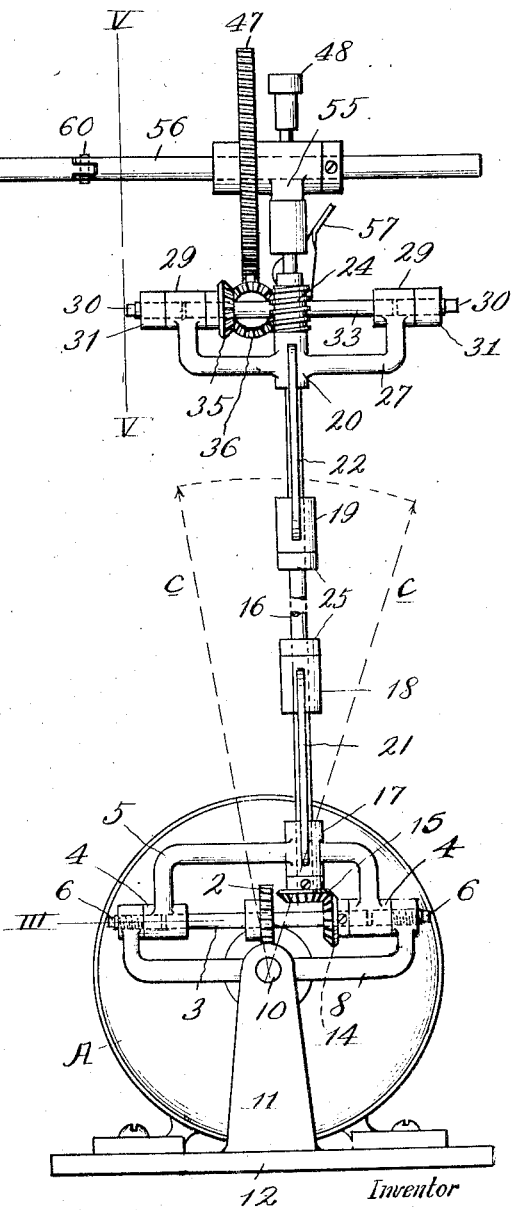
Witness:
R. C. Hamilton
L. J. Fischer
Inventor
Archie D. Standeford,
By F. J. Fischer, Atty.

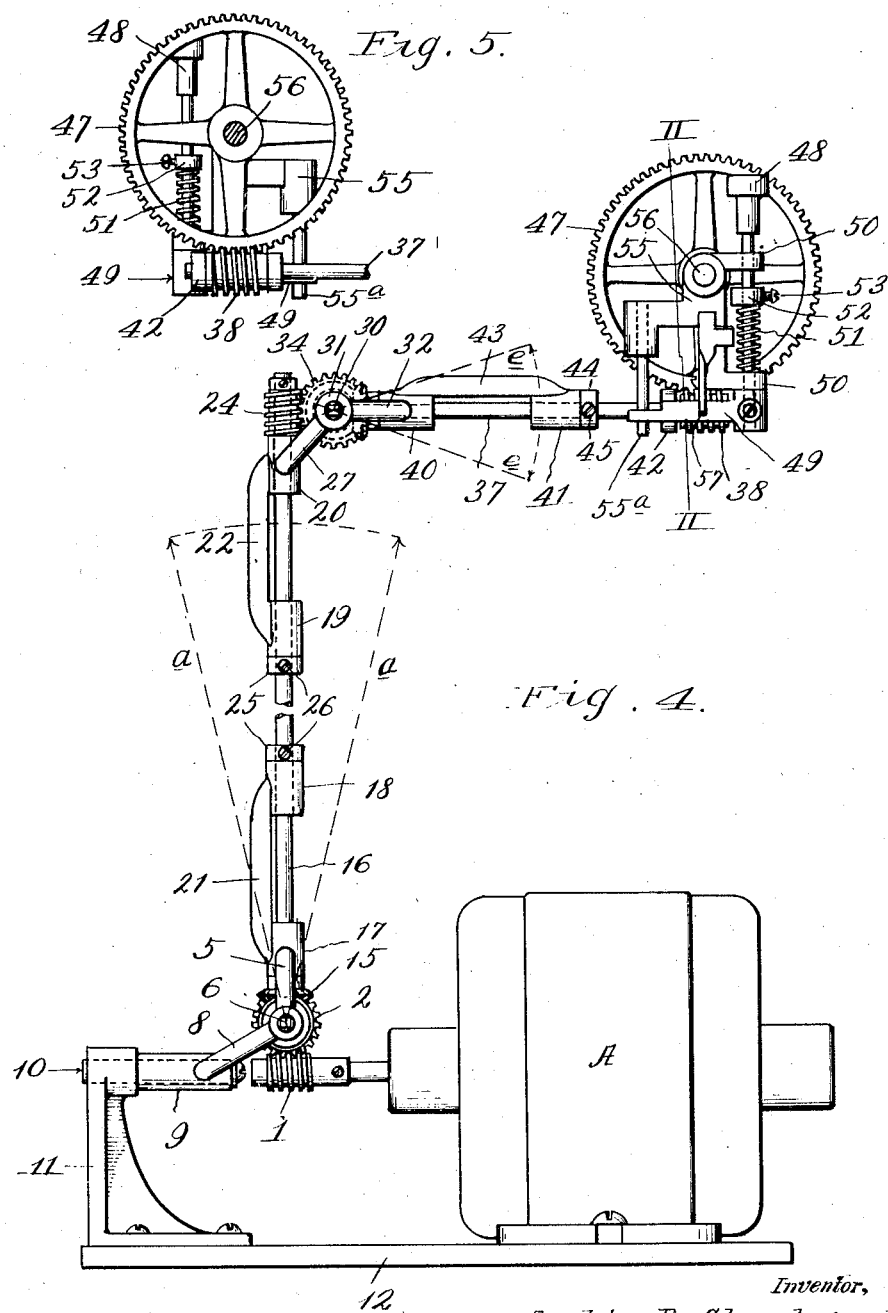

UNITED STATES PATENT OFFICE.

ARCHIE D. STANDEFORD, OF KANSAS CITY, MISSOURI.

UNIVERSAL TRANSMISSION-GEARING.

1,356,231.  Specification of Letters Patent.  Patented Oct. 19, 1920.

Application filed August 23, 1916. Serial No. 116,434.

*To all whom it may concern:*

Be it known that I, ARCHIE D. STANDEFORD, a citizen of the United States, residing at Kansas City, in the county of Jackson and State of Missouri, have invented certain new and useful Improvements in Universal Transmission-Gearing, of which the following is a specification.

My invention relates to improvements in universal transmission gearing, and one object is to provide new and useful gearing of this character in which the driven member may be adjusted to various positions independently of the driver of the gearing as occasion requires, without binding or cramping any of the parts, or otherwise interfering with the operation of the mechanism.

A further object is to provide gearing of this character which may automatically adjust itself to different positions while in operation and allow either the driver or the driven member to assume different positions independently of each other while in operation.

A further object is to provide means for holding the various gear wheels, constituting parts of the invention in mesh irrespective of the different positions the various parts may automatically assume, or be placed in by hand.

Other objects of the invention will hereinafter appear, and in order that said invention may be fully understood, reference will now be made to the accompanying drawings, in which:

Figure 1 is an elevation of the gearing connected to a motor and part of an arc lamp feeding mechanism.

Fig. 2 is an irregular vertical section on line II—II of Fig. 4.

Fig. 3 is a broken section, enlarged, on line III of Fig. 1.

Fig. 4 is an elevation turned at right angles to Fig. 1 and with the arc lamp feeding mechanism omitted.

Fig. 5 is a vertical section on line V—V of Fig. 1.

1 designates a worm which may be termed the driver of the mechanism. Said driver 1 may receive its motion from any suitable source, an electric motor A, being shown on the drawings. Worm 1 intermeshes with and drives a worm wheel 2, mounted upon a shaft 3 extending transversely to the axis of the worm 1. The shaft 3 is journaled at its ends in bearings 4 on the ends of a yoke 5, rockably-mounted on a pair of trunnions 6, threaded into a pair of bearings 7 at the ends of a yoke 8 fixed upon a sleeve 9, rockable upon a stub shaft 10 suitably mounted, as in a bracket 11, carried on a base plate 12 upon which the motor A is also mounted.

14 designates a bevel gear fixed upon the shaft 3 and intermeshing with a similar gear 15, fixed upon the lower end of a shaft 16 arranged at an angle of ninety degrees to the shaft 3 and journaled in bearings 17, 18, 19 and 20. Bearing 17 is formed integral with the yoke 5, while bearing 18 is connected to the bearing 17 by an arm 21, paralleling the shaft 16. The bearing 19 is connecting to the bearing 20 by an arm 22, which like the arm 21, parallels the shaft 16.

24 designates a worm fixed upon the opposite end of the shaft 16 from that on which the bevel gear 15 is mounted. Collars 25 abut the bearings 18 and 19 and are fixed to the shaft 16 by set screws 26 to secure said shaft against longitudinal movement in its bearings. The bearing 20 is carried by a yoke 27 provided at its ends with bearings 29 swiveled upon a pair of trunnions 30, threaded into a pair of bearings 31 integral with the ends of a yoke 32.

33 designates a shaft journaled in the bearings 29 and provided with a fixedly-mounted worm wheel 34 and a bevel gear 35, the former intermeshing with the worm 24, and the latter with a bevel gear 36 fixedly-mounted upon one end of a shaft 37, provided at its opposite end with a worm 38. The shaft 37 is journaled in bearings 40, 41, and 42. The bearing 40 is fixed to the yoke 32 and connected to the bearing 41 by an arm 43 paralleling the shaft 37. A collar 44 abutting the bearing 41 and fixed to the shaft 37 by a set screw 45, coacts with the bevel gear 36 in securing the shaft 37 from longitudinal movement in its bearings.

The worm 38 intermeshes with a large worm wheel 47, with which it is adapted to be thrown in and out of gear by a shaft bar 48 and a latch bar 49, which latter is secured to the former by a set screw 49ª, and carries the bearings 42. The latch bar 49 is normally held in raised position to retain the worm 38 in mesh with the worm wheel 47 and hold the latch bar 49 against the lowermost of a pair of shift bar guides 50, by a coil spring 51 embracing the shift bar 48 and interposed between said lowermost guide 50 and a collar 52 fixed to the shift bar by a set screw 53.

The guides 50 are fixed to a bracket 55 carrying a shaft 56, upon which the worm wheel 47 is fixedly-mounted. When the shift bar 48 is pressed down against the action of the spring 51 to disengage the worm 38 from the worm wheel 47, the latch bar 49 is automatically engaged and secured in lowered position by a gravity latch 57, mounted upon a pivot 58 carried by the bracket 55. The bracket 55 is prevented from rocking on the shift bar 48 and throwing the shaft 56 out of an angle of ninety degrees with the shaft 37, by a depending pin 55ª, which extends through the adjacent end of the latch bar 49 and guides said end when the latch bar is raised and lowered by the shift bar 48.

The shaft 56 is rendered flexible by joints 61 and 62 and is provided at one end with what might be termed the driven member, comprising a pinion 63, which in the present instance intermeshes with the ratchet bars C, constituting part of the feed mechanism of an arc lamp. However, it is to be understood that the power transmitted through the gearing from any source such as the motor A, may be utilized in driving various other mechanisms than that above referred to.

From the foregoing description, it will be readily understood that the driven member 63 of the transmission gearing can be arranged in various positions relative to the driver 1, owing to the flexible construction of said transmission gearing. For instance, the shaft 16 may be inclined in opposite directions as indicated by the dotted arrows *a*, Fig. 4, without disengaging the worm wheel 2 from the bevel gear 14, as said gears are held in their proper relative positions by the yokes 5 and 8 and the shaft 3.

Likewise the shaft 16 may be rocked in opposite directions as indicated by the dotted arrows *c*, Fig. 1, without disengaging any of the gears, by rocking the sleeve 9 upon the stub shaft 10. It is also apparent that the shaft 37 may be adjusted up and down as indicated by dotted arrows *e*, Fig. 4, by rocking the yoke 32 upon the trunnions 30, or said shaft 37 may be rocked laterally in opposite directions by rocking the bearings 19 and 20 upon the shaft 16, without disengaging any of the gear wheels.

It is further apparent that the foregoing adjustments may be effected either manually or automatically while the mechanism is in operation or at rest.

From the foregoing description, it is apparent that I have provided new and useful transmission gearing of such flexibility that the driven member 63 may be adjusted to various positions independently of the driver 1 without disengaging any of the various gear wheels, or springing the shafting, or causing lost motion, and while I have shown and described the preferred form of my invention, I reserve the right to make such changes in the construction, combination, and arrangement of parts as properly fall within the spirit and scope of the claims.

Having thus described my invention, what I claim and desire to secure by Letters Patent, is:

1. In a mechanism of the character described, a driver, a gear wheel driven thereby, a journaled shaft extending transversely to the axis of said driver and carrying the gear wheel, a rockable yoke in which the transverse shaft is journaled, a second shaft journaled in said rockable yoke and adapted to rock therewith, and intermeshing gears on said shafts adapted to remain in mesh irrespective of the positions to which the second shaft may be rocked.

2. In a mechanism of the character described, a driver, a swiveled sleeve mounted in axial alinement with said driver, a yoke carried by said sleeve, opposed trunnions carried by said yoke, a second yoke swiveled upon said trunnions, a shaft journaled in said second yoke, a gear wheel fixedly mounted upon said shaft and engaging the driver, a second gear wheel fixedly mounted upon the shaft, a third gear wheel engaging said second gear wheel, and a shaft journaled in the second yoke and carrying said third gear wheel.

3. In a mechanism of the character described, a driver worm, a support adjacent said worm, a sleeve in axial alinement with the worm and swiveled upon said support, a yoke fixed to and extending transversely to said sleeve, a second yoke having a swivel connection with the first yoke to rock therewith and also rock independently thereof, a shaft journaled in said second yoke, a worm wheel mounted upon said shaft and driven by the worm, a bevel gear mounted upon the shaft, a second bevel gear driven by the first one, and a second shaft carrying said second bevel gear and journaled in the second yoke, substantially as described.

4. In a mechanism of the character described, a pinion, racks driven by said pinion, a flexible shaft upon which said pinion is mounted, a large gear wheel fixedly mounted upon said shaft, a small gear wheel engaging said large gear wheel, a second shaft upon which said small gear wheel is mounted, a bevel gear mounted upon said second shaft, a second bevel gear to drive the first one, a third shaft extending transversely to the second shaft and carrying said second bevel gear, a yoke in which the second shaft is journaled, a second yoke swiveled to the first one and carrying the third shaft, and means for driving said third shaft.

5. In combination with a motor and the feed racks of an arc lamp feeding mechanism, a driver fixedly mounted upon the motor shaft, a gear wheel intermeshing with said driver, a shaft upon which said gear wheel is mounted, a yoke to support said shaft, a rockable sleeve carrying said yoke and arranged in alinement with the axis of the driver to permit the yoke to rock without disengaging the gear wheel from said driver, and a train of gears between said gear wheel and the feed racks whereby the latter are driven continuously in one direction by the former at a greatly reduced speed.

In testimony whereof I affix my signature, in the presence of a witness.

ARCHIE D. STANDEFORD.

Witness:
F. G. FISCHER.